(12) United States Patent
Kumar et al.

(10) Patent No.: US 12,088,587 B2
(45) Date of Patent: Sep. 10, 2024

(54) DEVICE COMMUNICATION MANAGEMENT FRAMEWORK FOR VOICE-BASED APPLICATIONS

(71) Applicant: Dell Products L.P., Round Rock, TX (US)

(72) Inventors: Dhilip S. Kumar, Bangalore (IN); Vidhyanshu Jain, Jabalpur (IN); Sasikanta Sahoo, Bangalore (IN)

(73) Assignee: Dell Products L.P., Round Rock, TX (US)

(*) Notice: Subject to any disclaimer, the term of this patent is extended or adjusted under 35 U.S.C. 154(b) by 327 days.

(21) Appl. No.: 17/406,696

(22) Filed: Aug. 19, 2021

(65) Prior Publication Data

US 2023/0055606 A1 Feb. 23, 2023

(51) Int. Cl.
*H04L 9/40* (2022.01)
*G06F 9/54* (2006.01)
*G06N 3/006* (2023.01)
*G10L 15/22* (2006.01)

(52) U.S. Cl.
CPC .......... *H04L 63/0869* (2013.01); *G06F 9/547* (2013.01); *G06N 3/006* (2013.01); *G10L 15/22* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 10,013,979 B1* | 7/2018 | Roman | G10L 15/063 |
| 2020/0125319 A1* | 4/2020 | Kim | G05B 15/02 |
| 2020/0310891 A1* | 10/2020 | Leichty | H04L 63/0807 |
| 2021/0119802 A1* | 4/2021 | Shetty | G10L 15/22 |
| 2021/0233537 A1* | 7/2021 | Yang | G10L 15/22 |

OTHER PUBLICATIONS

Azure, "Event Grid," https://azure.microsoft.com/en-us/services/event-grid/, Accessed Aug. 13, 2021, 19 pages.
Wikipedia, "WebSocket," https://en.wikipedia.org/wiki/WebSocket, Jul. 30, 2021, 9 pages.

* cited by examiner

*Primary Examiner* — Bassam A Noaman
(74) *Attorney, Agent, or Firm* — Ryan, Mason & Lewis, LLP

(57) ABSTRACT

A method comprises receiving a command inputted to a first device, analyzing the command and identifying a second device based at least in part on the analysis. In the method, the second device is authenticated and a connection is established between the first device and the second device over one or more networks. The command is for execution of a task on the second device.

20 Claims, 10 Drawing Sheets

DEVICE COMMUNICATION MANAGEMENT FRAMEWORK FOR VOICE-BASED APPLICATIONS

FIELD

The field relates generally to information processing systems, and more particularly to a framework for management of communication between devices.

BACKGROUND

Conversational artificial intelligence (AI) is a significant business enabler in today's modern business processes. Conversational AI is one of the fundamental building blocks in digital transformation.

Voice-based applications on a device interface with other applications on the device to enable users to input voice-activated commands and/or instructions to the applications as inputs. Such voice-based applications can be useful for users who may not want or be able to use other modes of input (e.g., keyboards, touchscreens, mice, etc.). In some cases, the voice-activated input results in faster execution of an application task than when using other input mechanisms. Voice command-driven applications enhance user experiences and can reduce the number of actions needed to be performed by a user to have applications execute tasks.

SUMMARY

Illustrative embodiments provide techniques to establish and manage communications between devices.

For example, in one embodiment, a method comprises receiving a command inputted to a first device, analyzing the command and identifying a second device based at least in part on the analysis. In the method, the second device is authenticated and a connection is established between the first device and the second device over one or more networks. The command is for execution of a task on the second device.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

DETAILED DESCRIPTION

Figure 1:
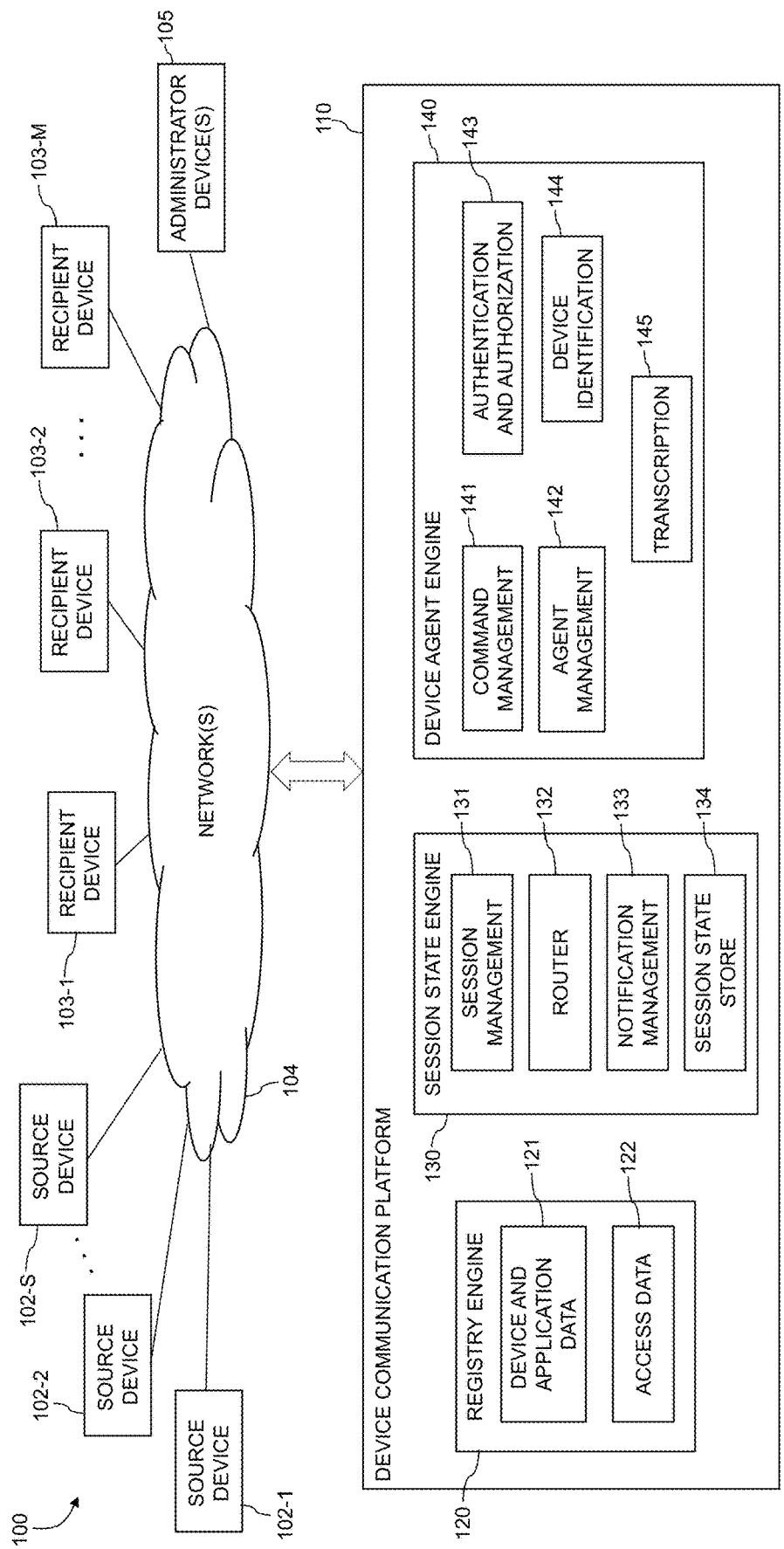
FIG. 1 depicts an information processing system with a device communication platform for enabling commands inputted to a first device to control execution of tasks on a second device in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "application programming interface (API)" or "interface" refers to a set of subroutine definitions, protocols, and/or tools for building software. Generally, an API defines communication between software components. APIs permit programmers to write software applications consistent with an operating environment or website.

As used herein, "natural language" is to be broadly construed to refer to any language that has evolved naturally in humans. Non-limiting examples of natural languages include, for example, English, Spanish, French and Hindi.

As used herein, "natural language processing (NLP)" is to be broadly construed to refer to interactions between computers and human (natural) languages, where computers are able to derive meaning from human or natural language input, and respond to requests and/or commands provided by a human using natural language.

As used herein, "natural language understanding (NLU)" is to be broadly construed to refer to a sub-category of natural language processing in AI where natural language input is disassembled and parsed to determine appropriate syntactic and semantic schemes in order to comprehend and use languages. NLU may rely on computational models that draw from linguistics to understand how language works, and comprehend what is being said by a user.

As used herein, "natural language generation (NLG)" is to be broadly construed to refer to a computer process that transforms data into natural language. For example, NLG systems decide how to put concepts into words. NLG can be accomplished by training ML models using a corpus of human-written texts.

As used herein, the term "virtual assistant" is to be broadly construed and may comprise, for example, AI based agents or other software applications that interact with users via a device. Virtual assistants may comprise, for example, chatbots or other software applications that can be used to conduct online conversations with users via text or speech, in lieu of providing direct contact with a live human agent. The virtual assistants simulate a conversational partner, and may be used in connection with, for example, information acquisition, user queries, customer service and request and/or command processing and/or routing. Virtual assistants as used herein may be capable of multilingual and multimode communication including, but not necessarily limited to, text-to-text, text-to-speech, speech-to-text and speech-to-speech. The virtual assistants may be executed on one or more processing devices or virtualized computing resources.

FIG. 1 shows an information processing system 100 configured in accordance with an illustrative embodiment. The information processing system 100 comprises source devices 102-1, 102-2, . . . 102-S (collectively "source devices 102"), recipient devices 103-1, 103-2, . . . 103-M (collectively "recipient devices 103") and one or more administrator devices 105. The source devices 102, recipient devices 103 and/or administrator device(s) 105 communicate over a network 104 with a device communication platform 110. In addition, the source devices 102 and recipient devices 103 communicate with each other over a network 104. In some instances, administrator device(s) 105 may communicate with the source devices 102 and/or recipient devices 103 over the network 104.

The source devices 102, recipient devices 103 and/or administrator device(s) 105 can comprise, for example, Internet of Things (IoT) devices, desktop, laptop or tablet computers, mobile telephones, wearable mobile devices (e.g., watches) or other types of processing devices capable of communicating with the device communication platform 110 or each other over the network 104. Such devices are examples of what are more generally referred to herein as "processing devices." Some of these processing devices are also generally referred to herein as "computers." The source devices 102, recipient devices 103 and/or administrator device(s) 105 may also or alternately comprise virtualized computing resources, such as virtual machines (VMs), containers, etc. The source devices 102, recipient devices 103 and/or administrator device(s) 105 in some embodiments comprise respective computers associated with a particular company, organization or other enterprise. The variables M and S, and other similar index variables herein such as K and L are assumed to be arbitrary positive integers greater than or equal to two.

The terms "client" or "user" herein are intended to be broadly construed so as to encompass numerous arrangements of human, hardware, software or firmware entities, as well as combinations of such entities. Device communication services may be provided for users utilizing one or more machine learning models, although it is to be appreciated that other types of infrastructure arrangements could be used. At least a portion of the available services and functionalities provided by the device communication platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the device communication platform 110, as well as to support communication between the device communication platform 110 and connected devices (e.g., source devices 102, recipient devices 103 and/or administrator device(s) 105) and/or other related systems and devices not explicitly shown.

In some embodiments, the administrator device(s) 105 are assumed to be associated with repair technicians, system administrators, information technology (IT) managers, software developers, release management personnel or other authorized personnel configured to access and utilize the device communication platform 110. One or more administrator devices 105 may be used by such personnel to administer the device communication platform 110.

The device communication platform 110 in the present embodiment is assumed to be accessible to the source devices 102, recipient devices 103 and/or administrator device(s) 105 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP), WebSocket or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The device communication platform 110 provides a platform to operate systems and/or applications on a first device (e.g. one of the recipient devices 103) in response to one or more commands received from a second device (e.g., one of the source devices 102). Advantageously, the embodiments permit activation of applications or other tasks across multiple devices. In one or more embodiments, the commands are received at a source device 102 as a voice and/or textual-based input via, for example, a virtual assistant operating on the source device 102. The embodiments identify the commands, standardize communications between source and recipient devices 102 and 103, format commands to be executed based on communication session interfaces used for the source and recipient devices 102 and 103 and transmit the commands from a source device 102 to a recipient device 103 where the commands are executed.

Figure 2:
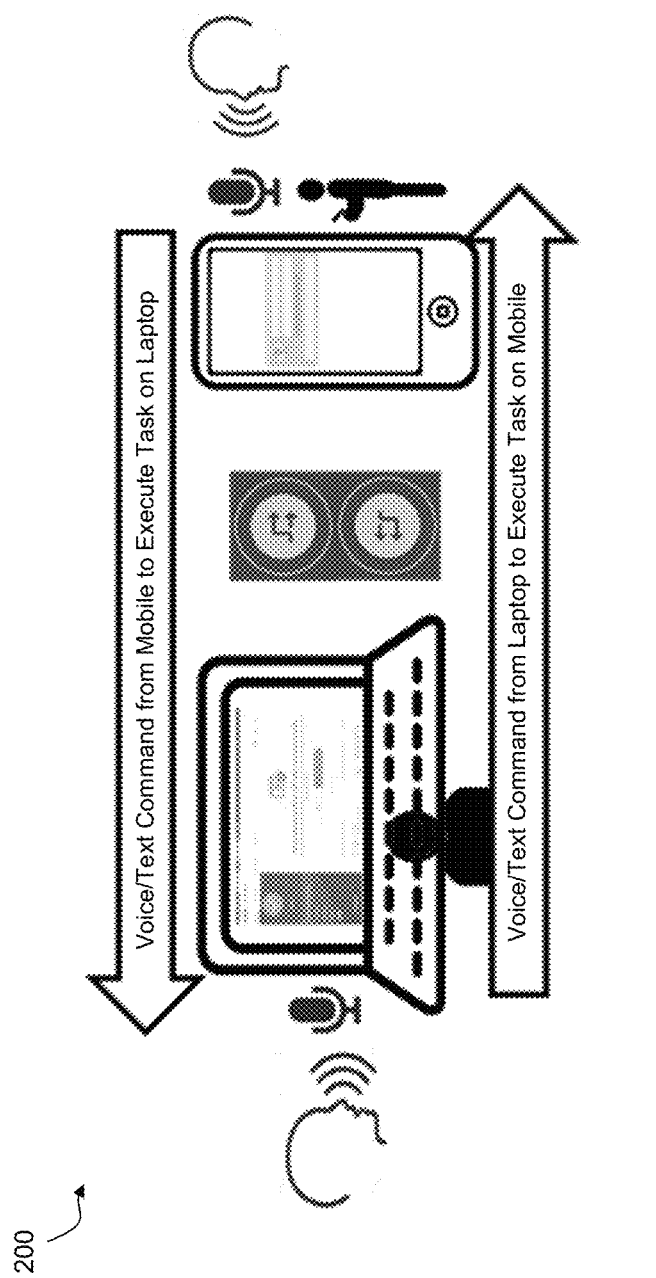
FIG. 2 depicts an operational diagram showing command input to a source device for executing tasks on a recipient device in an illustrative embodiment.

Referring to the operational diagram 200 in FIG. 2, in a non-limiting example embodiment, by utilizing the device communication platform 110, users may input voice and/or textual commands to a mobile device for executing tasks on a laptop computer and/or input voice and/or textual commands to a laptop computer for executing tasks on a mobile device. In the first instance, the mobile device and the laptop computer respectively comprise the source and recipient devices 102 and 103, and in the second instance, mobile device and the laptop computer respectively comprise the recipient and sources devices 103 and 102.

Various options for the combination of source and recipient devices 102 and 103 exist, including but not necessarily limited to, the combinations of a mobile telephone or tablet with a laptop computer, wearable mobile device or a desktop computer, the combinations of a laptop computer with a mobile telephone or tablet, wearable mobile device or a desktop computer, the combinations of a wearable mobile device with a mobile telephone or tablet, laptop computer or a desktop computer, and the combinations of desktop computer with a laptop computer, wearable mobile device or a mobile telephone or tablet.

Referring to FIG. 1, the device communication platform 110 includes a registry engine 120, a session state engine 130 and a device agent engine 140. The registry engine 120 comprises a device and application data layer 121 and an access data layer 122. The session state engine 130 comprises a session management layer 131, a router layer 132, a notification management layer 133 and a session state store 134. The device agent engine 140 includes a command management layer 141, an agent management layer 142, an authentication and authorization layer 143, a device identification layer 144 and a transcription layer 145.

The device communication platform 110 enables the operation of applications and/or systems on a recipient device 103 to be initiated and/or controlled by a source device 102. The device and application data layer 121 includes stored information corresponding the source and recipient devices 102 and 103, such as, for example, universally unique identifiers (UUIDs), location codes, physical device serial numbers and names, virtual machine (VM) identifiers and/or names, and IP addresses and/or names. The device and application data layer 121 further includes details of applications or other software on the source and/or recipient devices 1-2 and 103, such as, for example, application names, versions and update information. The access data layer 122 includes stored information corresponding to user access and access details for source and recipient devices 102 and 103 including, but not necessarily limited to, permissions, privileges, login information, passwords, tokens, keys, voice activation information or other access information. For example, the information may include the devices that a user is permitted to access or use, as well as a listing of devices that a given device can access, be accessed by, transmit messages and/or data to, and/or receive messages and/or data from. As explained further herein, in connection with the authentication and authorization layer of the device agent engine 140, the device agent engine 140 configures device agents for the source and recipient devices 102 and 103, which use the data from the registry engine 120 to authenticate users and/or devices, and authorize communications from authenticated users to be sent between authenticated devices. In one or more embodiments, the authentication and authorization layer 143 may continuously authenticate a user following every statement made by the user during a given communication session.

The session state engine 130 establishes and maintains bi-directional communication sessions between source and recipient devices 102 and 103 (e.g., mobile and desktop/laptop devices or vice versa). When a command is received and processed by a source device 102, the session state engine 130 handles transmission of the command to the recipient device 103. For example, the session management layer 131 establishes the bi-directional communication session between the source device 102 and the recipient device 103 using a communication protocol (e.g., WebSocket) and one or more session state APIs, and details of the communication session are stored in a session state store 134. In some embodiments, the session management layer 131 tokenizes the communication session, and formats commands from a source device 102 to conform to the one or more session state APIs. In one or more embodiments, the session management layer 131 identifies a connected session by analyzing a voice input and corresponding the voice input to a particular user, command and/or communication session. For example, the session management layer 131 analyzes the context of a given input in connection with identifying a communication session. The session management layer 131 is also responsible for governance of a communication to ensure that communications between source and recipient devices 102 and 103 are in compliance with regulations and are safe.

In accordance with an embodiment, the connection between a source device 102 and the second device comprises a connection between a first device agent corresponding to the source device 102 and a second device agent corresponding to the recipient device 103. The agent management layer 142 of the device agent engine 140 manages native and remote agents of respective ones of the source and/or recipient devices 102 and 103. The agents standardize interaction between source and recipient devices 102 and 103. For example, referring to the operational diagram 700 in FIG. 7, a communications session between a source device 702 and a recipient device 703 utilizes a communication protocol (e.g., WebSocket) and a session state API 790. Details of the communication session are stored in a session state store 734. The communication session is established between an agent 740-1 of the source device 702 and an agent 740-2 of the recipient device 703. The source and recipient devices 702 and 703 comprise respective applications 775-1 and 775-2. According to an embodiment, commands inputted through an application 775-1 to the source device 702 are sent to the recipient device 703 so that the commands can be executed by the application 775-2 on the recipient device. The commands are sent in a communication session configured in accordance with the communication protocol 791 and using the session state API 790.

Figure 3:
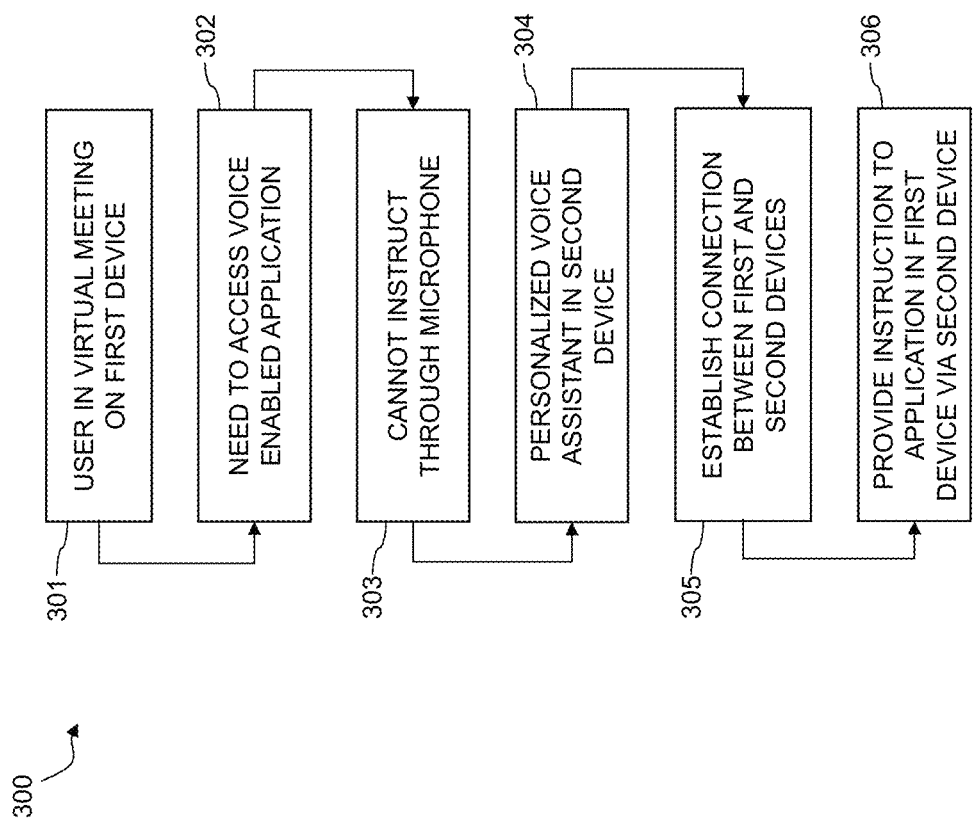
FIG. 3 depicts an operational flow illustrating use of a first device to execute tasks on a second device in a virtual meeting scenario in an illustrative embodiment.

Referring to the operational flow 300 in FIG. 3, at blocks 301 and 302, a user is participating in a virtual meeting on a first device (e.g., laptop computer) and wants or needs to access a voice-enabled application on the first device. However, referring to block 303, since the laptop microphone is engaged for the virtual meeting, the user cannot issue the voice command through the laptop microphone. According to the embodiments, referring to blocks 304 and 305, the user accesses a personalized voice assistant (e.g., virtual assistant) via a second device (e.g., the user's mobile device), and a connection is established between the mobile device and the laptop. Referring to block 306, the voice activated instruction is sent to the first device (e.g., laptop device) from the second device (e.g., mobile device) so that the voice enabled application on the first device (e.g., laptop device) can be enabled without deactivating the microphone being used in the virtual conference.

Figure 4:
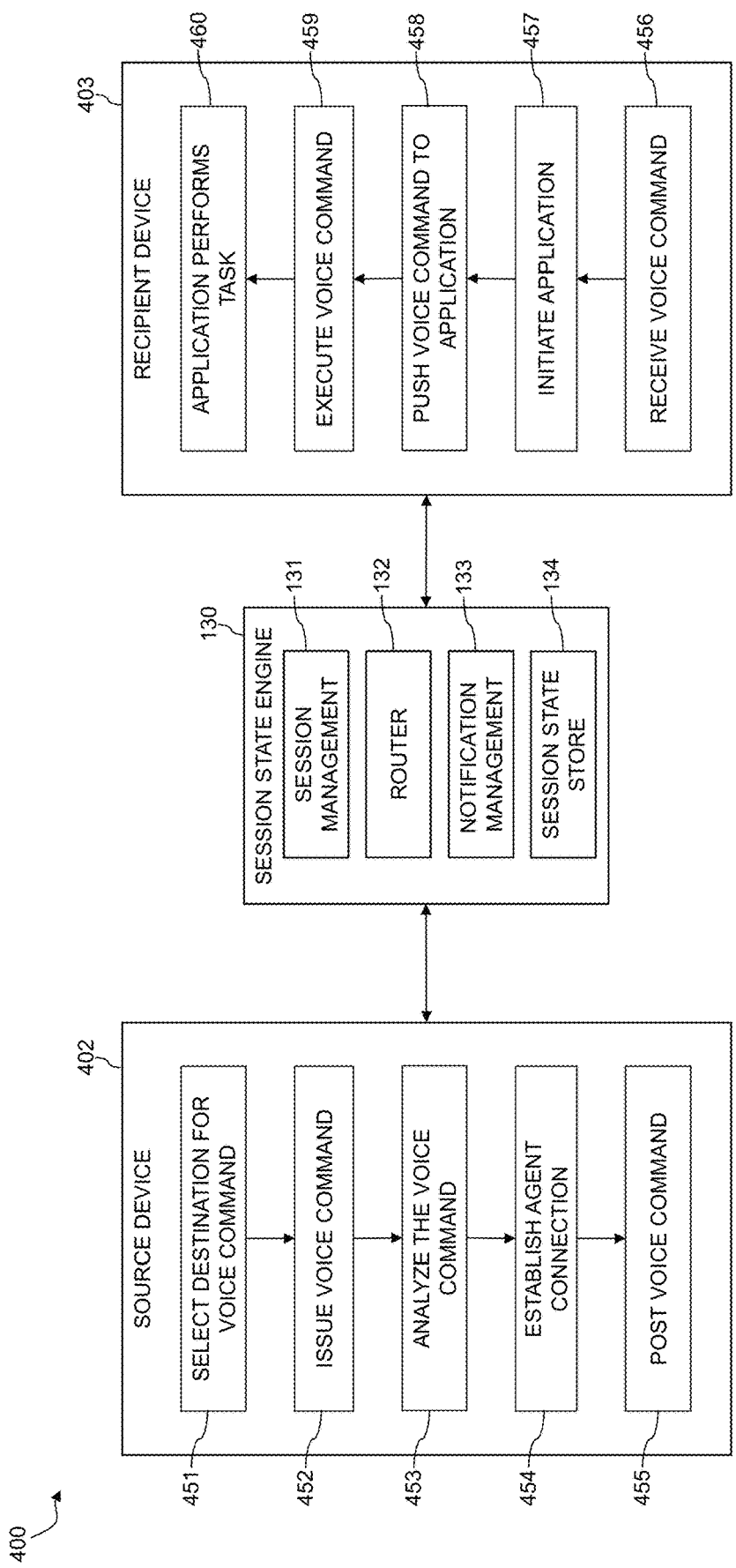
FIG. 4 depicts an operational flow where commands are inputted to a source device for execution of tasks on a recipient device in an illustrative embodiment.

As can be understood from the non-limiting operational example in FIG. 3, the embodiments provide a system that publishes commands from a first device (e.g., source device 102) to a second device (e.g., recipient device 103) via a communication session established between the devices. The session is established between the devices following an authentication process, which ensures security of the session. Referring to the operational flow 400 in FIG. 4, where commands are inputted to a source device 402 for execution of tasks on a recipient device 403, a user selects a destination (e.g., recipient device) for a voice command at block 451. At block 452, a voice command (or other type of command (e.g., text command)) is received on the source device 402. Using, for example, command management, authentication and authorization, device identification and transcription layers 141, 143, 144 and 145 of the device agent layer 140, an intelligent agent analyzes the voice command at block 453 to determine an intent of the command and identify the recipient device 403 from details of the command. The recipient device 403 is identified using preconfigured and/or on-boarded source and recipient device identifying and connection details from one or more registries of the registry engine 120, and which may be understood from the language of the command. A transcription layer 145 uses NLP and/or NLU techniques to extract command details from voice or text commands inputted to the source device 402.

At block 454, the session state engine 130 and the agent management layer 142 establish a connection to a remote agent (e.g., agent of the recipient device 403) with an agent router 132. Once the router 132 establishes the connection with the remote agent, a session between the source and recipient devices 402 and 403 is stored in the session state store 134. The session management layer 131 maintains and tokenizes the session for all communications during the session. At block 455, using the command management layer 141, the source device 402 posts the voice command. The session management layer 131 standardizes communication between the source and recipient devices 402 and 403, and formats the command based on session APIs. The session management layer 131 chooses a suitable session to connect the source and recipient devices 402 and 403 and their agents, and maintains all the states of the session.

Using the authentication and authorization layer 143, an agent of the recipient device 403 authenticates the source device 402 based on data in the registry engine 120 and sends the session details to the recipient device 403. At block 456, the command is received from the source device. At blocks 457 and 458, using, for example, the command management layer 141, the recipient device 403 validates the command, initiates an application on the recipient device 403 corresponding to the command and pushes the command to the application. In one or more embodiments, the application is registered in a registry, and the registration information is stored in the device and application data layer 121 of the registry engine 120. Referring to blocks 459 and 460, the command is executed and the application performs the task associated with the command. A notification management layer 133 comprises, for example, a notification handler, which is used to transmit a notification to the application that the command has been validated.

Figure 5:
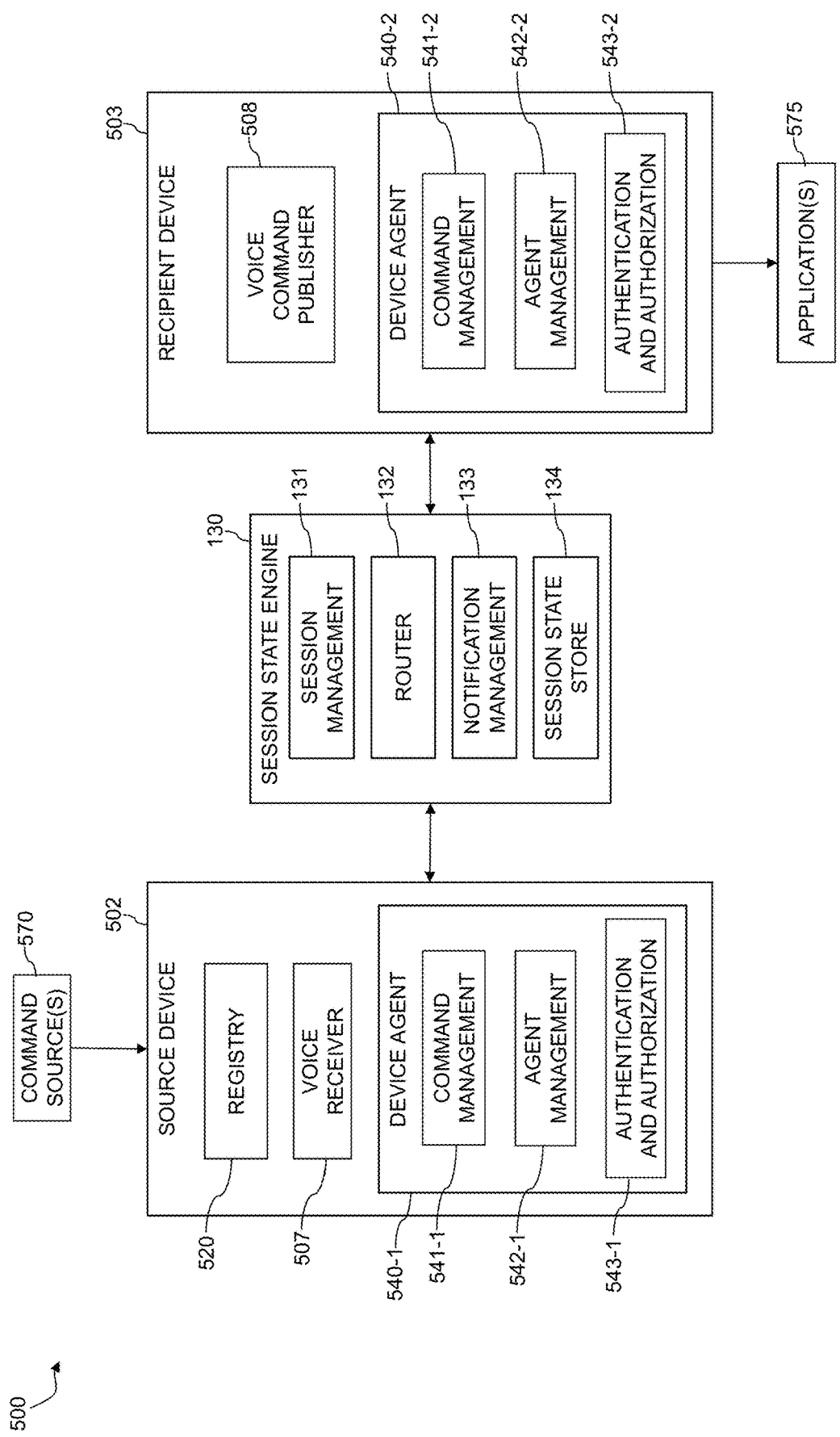
FIG. 5 depicts an operational diagram illustrating interactions between source and recipient devices and their corresponding device agents in an illustrative embodiment.

In the operational diagram 500 in FIG. 5, interactions between source and recipient devices 502 and 503 and their corresponding device agents 540-1 and 540-2 are shown. Similar to the device agent engine 140 in FIG. 1, the device agents 540-1 and 540-2 each include a command management layer 541-1, 541-2, an agent management layer 542-1, 542-2 and an authentication and authorization layer 543-1, 543-2. In accordance with an embodiment, voice dialog or other types of input (e.g., textual input) are received at the source device 502 via one or more command sources 570. In an embodiment, the command sources 570 comprise virtual assistants, but the embodiments are not necessarily limited to virtual assistants as command sources 570. In the case of voice commands, a voice receiver 507 receives the voice commands. The device agent 540-1 continually streams the voice commands and identifies the source device 502 and/or its applications using the registry engine 520.

The command management layers 541-1, 541-2 identify the intent of voice command dialog. The session management layer 131 of the session state engine 130 identifies source and recipient device operating systems, and using the router layer 132 and the agent management layers 542-1 and 542-2, connects the appropriate source and recipient device agents to deliver the voice commands from the source device 502 to the recipient device 503.

The session management layer 131, along with the authentication and authorization layers 543-1 and 543-2, maintains the session state and the security of the connections and the routes to the recipient device 503 from the source device 502. The device communication platform 110 abstracts the complexities of using multiple device assistants, which is not apparent to an end user. As can be seen in FIG. 5, the device agents 540-1 and 540-2 and the session state engine 130 establish sessions and configure security between source and recipient devices 502 and 503. The authentication and authorization layers 543-1 and 543-2 are responsible for security (e.g., authentication and authorization of multiple voice communications). The device agents 540-1 and 540-2 further handle mediation and integration of users and back-end voice assistants. The session state store 134 stores voice states and maintains context between device agent communications from the same user. The voice command publisher 508 provides the voice commands to the application(s) 575 of the recipient device 503 so that the tasks may be executed on the recipient device 503.

Figure 6:
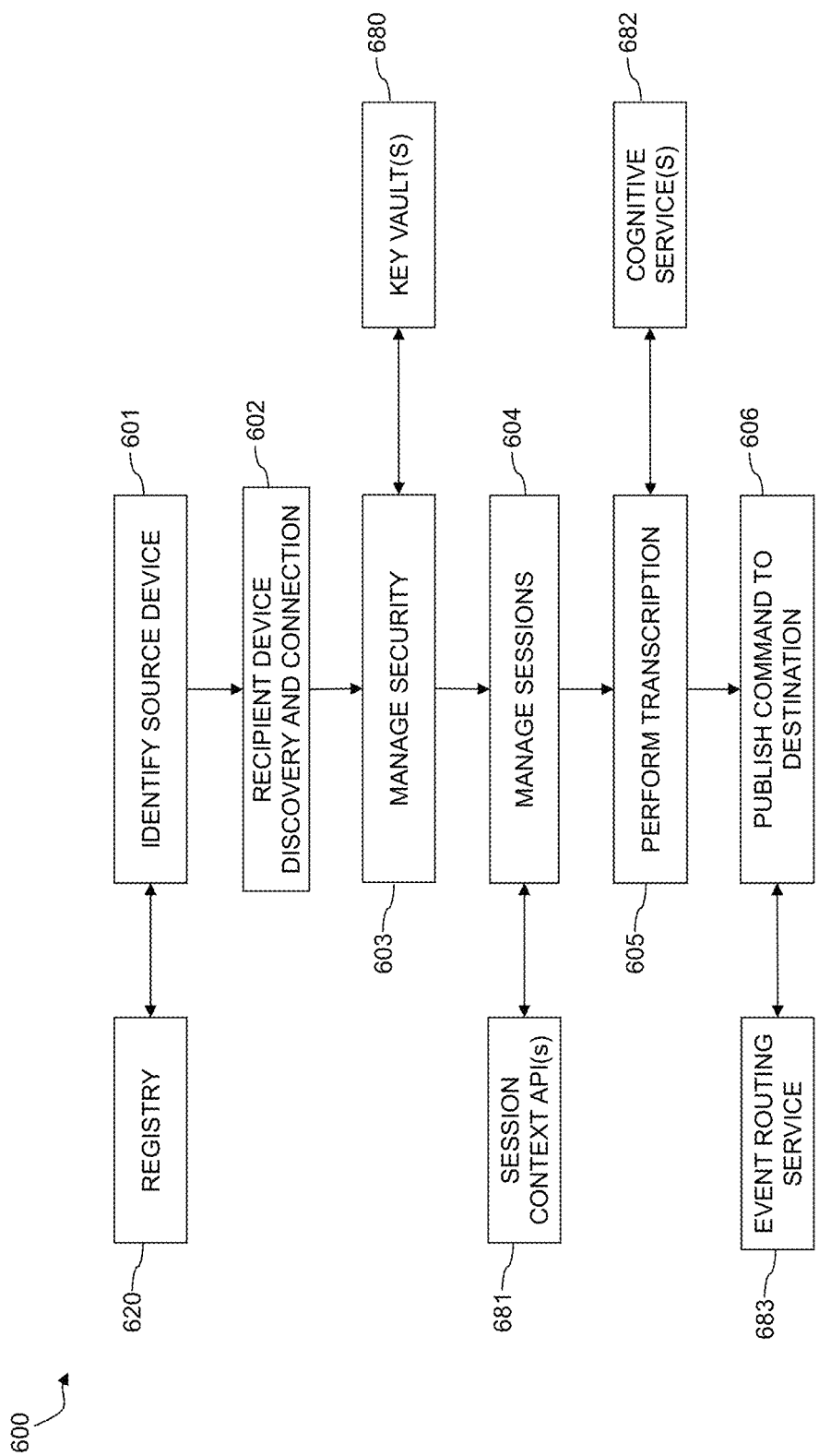
FIG. 6 depicts an operational flow of operation of a device agent in an illustrative embodiment.

Referring to FIG. 1 and to the operational flow 600 in FIG. 6, device agents provide a device agonistic solution to voice integration for any source or recipient device 102 or 103. Using a transcription layer 145 and NLU, NLP and/or NLG techniques, device agents convert speech to text (or vice versa) and deliver events to a recipient device 103. Referring to block 601, in one or more embodiments, device agents continually stream voice commands and identify source devices and applications using a device registry 620. At block 602, device agents using, for example, device identification layer 144 perform recipient device discovery processes to discover recipient devices 103 to find recipient connection patterns in which speech can be delivered. The patterns can be asynchronous or synchronous patterns. The asynchronous pattern uses a publisher subscriber model and sync APIs. At block 603, a recipient device security component (e.g., authentication and authorization layer 143) uses a secret key vault(s) 680 to manage security by maintaining endpoints, secret keys and tokens. At block 604, the session management layer 131 manages sessions. More specifically, the session management layer 131, using one or more session context APIs 681, maintains sessions between two devices and the user, which facilitates maintenance of user transactions between device systems and/or applications. Referring to block 605, a voice-to-text (and/or text-to-voice) transcription layer 145 continuously generates transcripts of voice command data using cognitive services 682. Referring to block 606, using an event routing management service 683 such as, for example, Event Grid, for managing routing of events from a source to a destination, the command is published to a destination (e.g., corresponding application on the recipient device 103).

Figure 7:
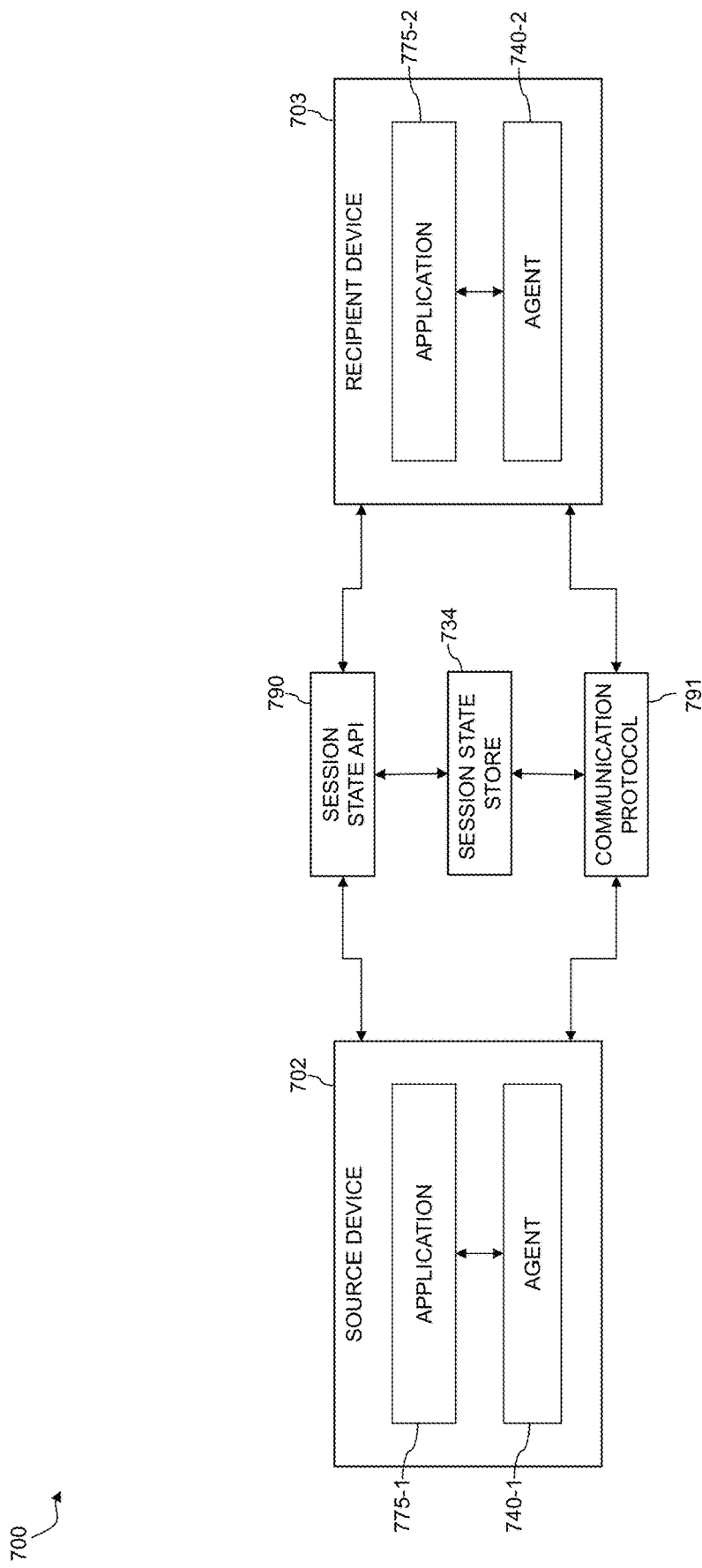
FIG. 7 depicts an operational diagram illustrating a communications session between source and recipient devices in an illustrative embodiment.

Referring back to the operational diagram 700 in FIG. 7, session states are critical to maintaining the session details of each connected application 775-1, 775-2 and/or system. A messaging application uses a computer communication protocol 791, such as, for example, WebSocket, to effectively communicate with its connected devices (e.g., devices 702 and 703). The session state store 734 maintains active sessions and devices 702 and 703. If a recipient device 703 is out of the session, using, for example, the notification management layer 133, the source device 702 is notified that the recipient device 703 is not available to take a task. An event driven approach is handled with computer communications protocol session information, and may comprise multi-directional events from any source to any recipient device. A publisher/subscriber handler is used for the asynchronous exchange of messages.

According to one or more embodiments, the session state store 134/734 or other databases or storage referred to herein are implemented using one or more storage systems or devices, which can be associated with the device communication platform 110. In some embodiments, one or more of the storage systems utilized to implement the databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the device communication platform 110, the registry engine 120, session state engine 130 and/or device agent engine 140 in other embodiments can be implemented at least in part externally to the device communication platform 110, for example, as stand-alone servers, sets of servers or other types of systems coupled to the network 104. For example, the registry engine 120, session state engine 130 and/or device agent engine 140 may be provided as cloud services accessible by the device communication platform 110. Alternatively, the registry engine 120, session state engine 130 and/or device agent engine 140 may be integrated in whole or in part in one or more of the source devices 102 and/or recipient devices 103.

The registry engine 120, session state engine 130 and/or device agent engine 140 in the FIG. 1 embodiment are each assumed to be implemented using at least one processing device. Each such processing device generally comprises at least one processor and an associated memory, and implements one or more functional modules for controlling certain features of the registry engine 120, session state engine 130 and/or device agent engine 140.

At least portions of the device communication platform 110 and the elements thereof may be implemented at least in part in the form of software that is stored in memory and executed by a processor. The device communication platform 110 and the elements thereof comprise further hardware and software required for running the device communication platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the registry engine 120, session state engine 130, device agent engine 140 and other elements of the device communication platform 110 in the present embodiment are shown as part of the device communication platform 110, at least a portion of the registry engine 120, session state engine 130, device agent engine 140 and other elements of the device communication platform 110 in other embodiments may be implemented on one or more other processing platforms that are accessible to the device communication platform 110 over one or more networks. Such elements can each be implemented at least in part within another system element or at least in part utilizing one or more stand-alone elements coupled to the network 104.

It is assumed that the device communication platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the registry engine 120, session state engine 130, device agent engine 140 and other elements of the device communication platform 110, and the elements thereof can each be implemented in the form of one or more LXCs running on one or more VMs. Other arrangements of one or more processing devices of a processing platform can be used to implement the registry engine 120, session state engine 130 and device agent engine 140, as well as other elements of the device communication platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the device communication platform 110 to reside in different data centers. Numerous other distributed implementations of the device communication platform 110 are possible.

Accordingly, one or each of the registry engine 120, session state engine 130, device agent engine 140 and other elements of the device communication platform 110 can each be implemented in a distributed manner so as to comprise a plurality of distributed elements implemented on respective ones of a plurality of compute nodes of the device communication platform 110.

It is to be appreciated that these and other features of illustrative embodiments are presented by way of example only, and should not be construed as limiting in any way. Accordingly, different numbers, types and arrangements of system elements such as the registry engine 120, session state engine 130, device agent engine 140 and other elements of the device communication platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the device communication platform can be offered to cloud infrastructure customers or other users as part of FaaS, CaaS and/or PaaS offerings.

Figure 8:
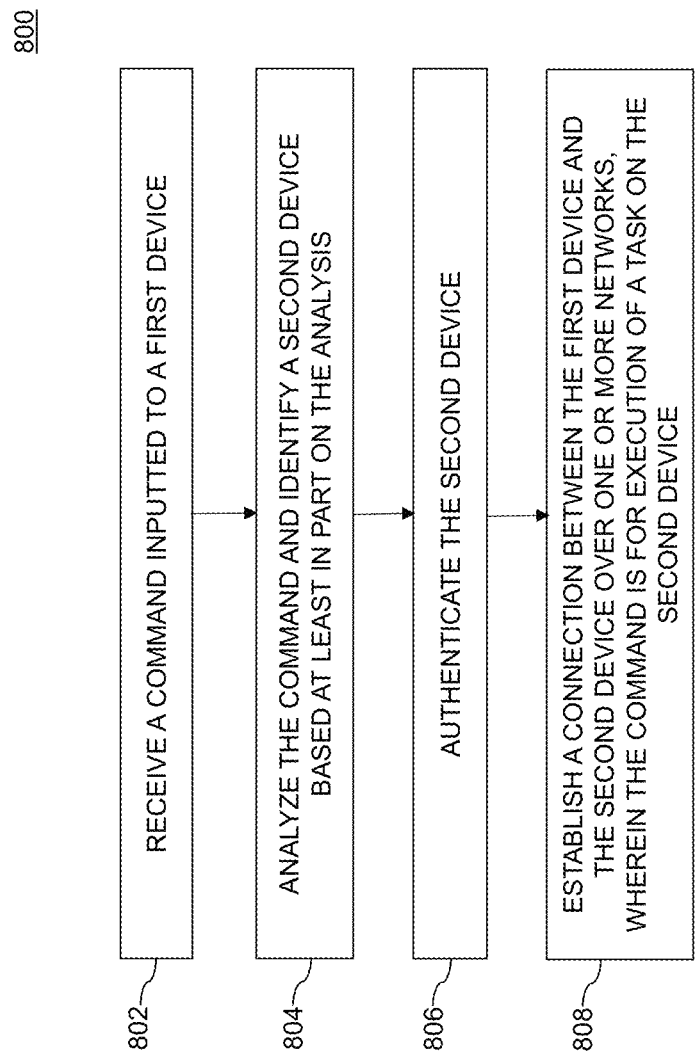
FIG. 8 depicts a process for enabling commands inputted to a first device to control execution of tasks on a second device according to an illustrative embodiment.

The operation of the information processing system 100 will now be described in further detail with reference to the flow diagram of FIG. 8. With reference to FIG. 8, a process 800 for enabling commands inputted to a first device to control execution of tasks on a second device as shown includes steps 802 through 808, and is suitable for use in the system 100 but is more generally applicable to other types of information processing systems comprising a device communication platform configured for enabling commands inputted to a first device to control execution of tasks on a second device.

In step 802, a command inputted to a first device is received. The command is for execution of a task on the second device. The command may comprise a voice command, a textual command or some other type of command. The command may be inputted via, for example, a virtual assistant. The command is passed to an application on the second device to execute the task.

In step 804, the command is analyzed and a second device is identified based at least in part on the analysis. Analyzing the command may comprise performing at least one of NLP and/or NLU to determine, for example, the intent of the command, the devices associated with the command and/or the task to be performed by the command. Identifying the second device may be further based at least in part on device connection details from a registry. Such connection details may include, for example, communication ports, interfaces, protocols or details of other mechanisms used for connecting to the second device.

In step 806, the second device is authenticated. Authenticating the second device comprises determining that identifying information corresponding to the second device is in a registry. The identifying information may comprise, for example, UUIDs, location codes, physical device serial numbers and names, VM identifiers and/or names, and IP addresses and/or names.

In step 808, a connection is established between the first device and the second device over one or more networks. In an embodiment, the connection between the first device and the second device comprises a connection between a first device agent corresponding to the first device and a second device agent corresponding to the second device. Establishing the connection between the first device and the second device may comprise establishing a bi-directional communication session between the first device and the second device using a communication protocol and one or more session state APIs. Details of the communication session may be stored in a session state store, and the communication session may be tokenized. The command is formatted based at least in part on the one or more session state APIs.

The command can be inputted by a user, and the method further comprises authenticating the user. In one or more embodiments, the user is continuously authenticated responsive to respective ones of a plurality of inputs by the user. In other words, the user may be continuously authenticated with each respective input of the user.

It is to be appreciated that the FIG. 8 process and other features and functionality described above can be adapted for use with other types of information systems configured to execute device communication services in a device communication platform or other type of platform.

The particular processing operations and other system functionality described in conjunction with the flow diagram of FIG. 8 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 8 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a device communication platform as disclosed herein can provide a number of significant advantages relative to conventional arrangements. For example, the device communication platform advantageously provides storage of system, application and access details for source and recipient devices, and a gateway to authenticate interactive users with every statement in a communication session. The embodiments also establish and maintain bi-directional communication states between different devices (e.g., mobile and desktop/laptop devices). As additional advantages, the embodiments identify connected sessions by analyzing voice inputs, and utilize agents to standardize interactions between devices.

Under current approaches, command-driven applications using conversational AI (e.g., virtual assistant applications) use commands only in their single respective devices, and such commands cannot be used across multiple devices. For example, under a current scenario, a user in a virtual meeting on a device (e.g., Zoom, Microsoft Teams, etc.) that wants or needs to access a voice-enabled application on that device must wait for the virtual meeting to end or exit the virtual meeting since the device microphone is engaged during the virtual meeting and the user cannot use the device microphone to issue the voice command. Unlike current approaches, the embodiments advantageously provide the user with the capability to issue the voice commands needed to operate the voice-enabled application from another device.

In another current scenario, during a video conference (e.g., Zoom, Microsoft Teams, etc.), a demonstration or presentation material that is being shared with the conference participants is exclusively controlled by the sharing party, and other parties do not have the ability to control the demonstration or presentation material, or share other material unless the sharing party ceases sharing/control. Unlike current approaches, the embodiments advantageously provide a user with the capability to issue commands from their device to exercise control of the demonstration or presentation material on another device, even when the demonstration or presentation material is concurrently under the control of another party. Additionally, unlike the current approaches, the embodiments enable customers and development team members to simultaneously have remote access to the same device during software development in order to reproduce issues or bugs.

The embodiments advantageously provide techniques for generating specialized and secure communication sessions between devices to enable command events to be received and transmitted across multiple devices. The embodiments utilize specialized registries, device agents, and authentication mechanisms to maintain security and user access.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the device communication platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a device communication platform in illustrative embodiments. These and other cloud-based systems in illustrative embodiments can include object stores.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
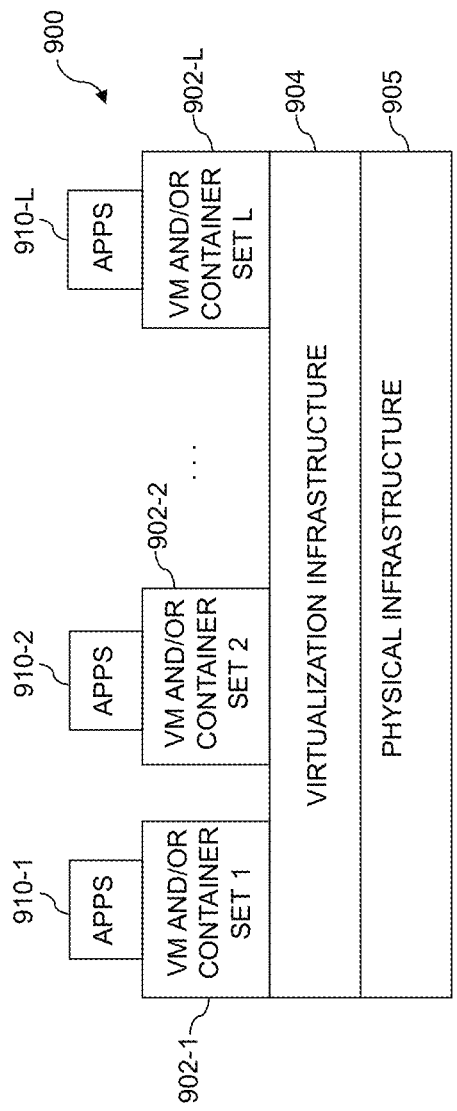
FIGS. 9 and 10 show examples of processing platforms that may be utilized to implement at least a portion of an information processing system according to illustrative embodiments.
Figure 10:
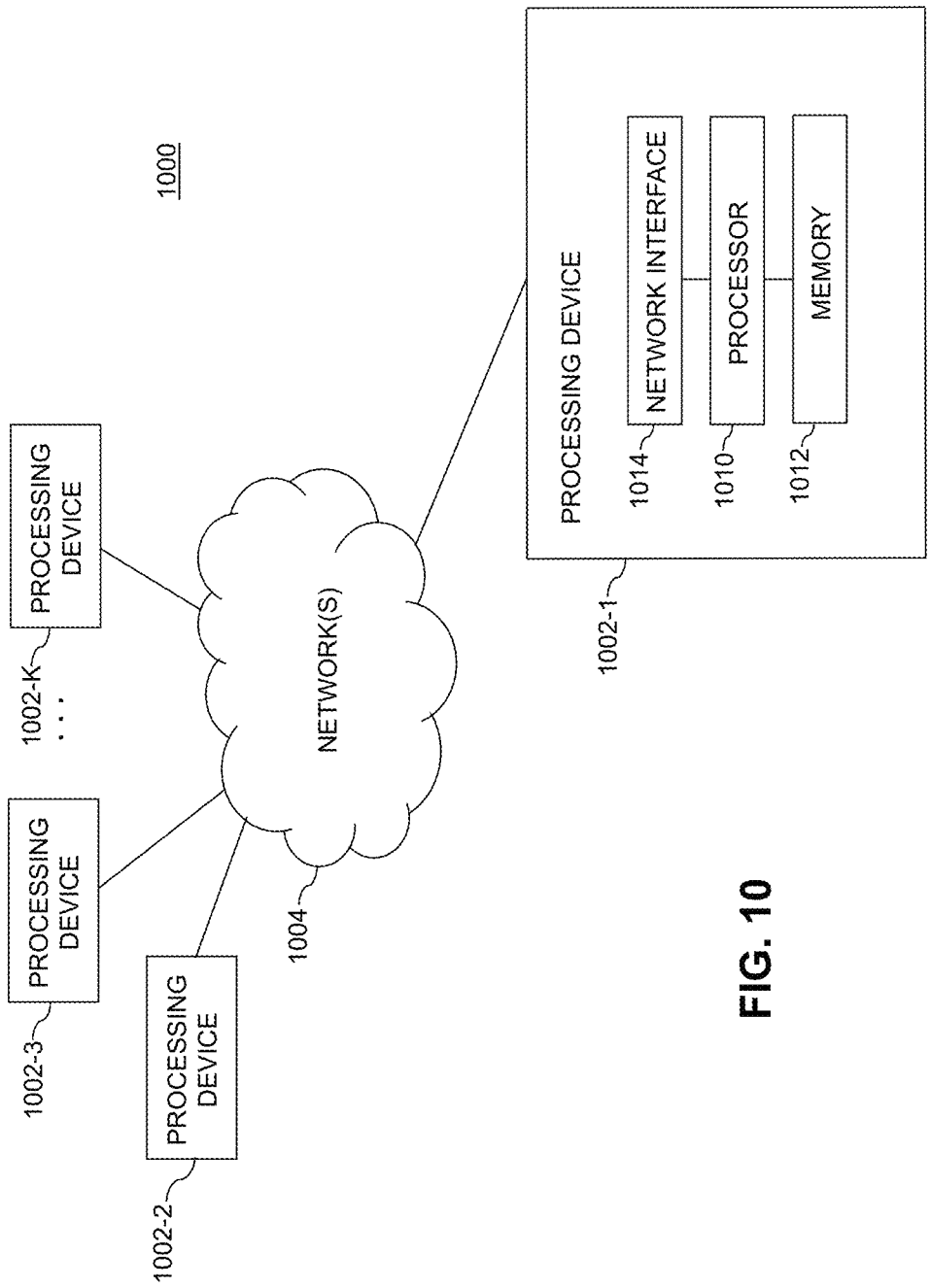

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, ... 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012. The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the device communication platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and device communication platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

receiving a voice command inputted by a user to a first device, wherein the voice command comprises one or more details to identify a destination device for the voice command;

analyzing the voice command and identifying a second device as the destination device based at least in part on the analysis; and authenticating the second device;

wherein a connection between the first device and the second device is established over one or more networks;

wherein the connection between the first device and the second device comprises a communication session between a first device agent of the first device and a second device agent of the second device;

wherein the first device agent:

(i) streams the voice command to the second device agent, (ii) continually streams additional voice commands to the second device agent, and (iii) identifies one or more voice-activated applications of the second device based at least in part on a registry;

wherein the voice command further comprises one or more instructions for execution of a task on the second device;

wherein in response to streaming the voice command to the second device agent, the second device agent receives the voice command in place of an unavailable voice-receiving apparatus of the second device;

wherein the unavailable voice-receiving apparatus is busy with a voice-receiving application and unavailable to receive the voice command from the user without interrupting the voice-receiving application;

wherein the second device agent receiving the voice command in place of the unavailable voice-receiving apparatus enables the second device to activate the one or more voice-activated applications in response to the voice command without using the unavailable voice-receiving apparatus; and wherein steps of the method are executed by a processing device operatively coupled to a memory.

2. The method of claim 1, wherein authenticating the second device comprises determining that identifying information corresponding to the second device is in the registry.

3. The method of claim 1, wherein the communication session comprises a bi-directional communication session which is established using a communication protocol and one or more session state application programming interfaces.

4. The method of claim 3, further comprising storing details of the communication session in a session state store.

5. The method of claim 3, further comprising tokenizing the communication session.

6. The method of claim 3, further comprising formatting the voice command based at least in part on the one or more session state application programming interfaces.

7. The method of claim 1, wherein analyzing the voice command comprises performing at least one of natural language processing and natural language understanding.

8. The method of claim 1, further comprising authenticating the user.

9. The method of claim 8, wherein the user is continuously authenticated responsive to respective ones of a plurality of inputs by the user.

10. The method of claim 1, wherein the voice command is inputted by the user via a virtual assistant.

11. The method of claim 1, wherein identifying the second device is further based at least in part on device connection details from the registry.

12. The method of claim 1, wherein the voice command is passed to the one or more voice-activated applications on the second device to execute the task.

13. An apparatus comprising:
a processing device comprising a processor operatively coupled to a memory and configured to:
receive a voice command inputted by a user to a first device, wherein the voice command comprises one or more details to identify a destination device for the voice command;
analyze the voice command and identify a second device as the destination device based at least in part on the analysis; and
authenticate the second device;
wherein a connection between the first device and the second device is established over one or more networks;
wherein the connection between the first device and the second device comprises a communication session between a first device agent of the first device and a second device agent of the second device;
wherein the first device agent:
(i) streams the voice command to the second device agent,
(ii) continually streams additional voice commands to the second device agent, and
(iii) identifies one or more voice-activated applications of the second device based at least in part on a registry;
wherein the voice command further comprises one or more instructions for execution of a task on the second device;
wherein in response to streaming the voice command to the second device agent, the second device agent receives the voice command in place of an unavailable voice-receiving apparatus of the second device;
wherein the unavailable voice-receiving apparatus is busy with a voice-receiving application and unavailable to receive the voice command from the user without interrupting the voice-receiving application; and
wherein the second device agent receiving the voice command in place of the unavailable voice-receiving apparatus enables the second device to activate the one or more voice-activated applications in response to the voice command without using the unavailable voice-receiving apparatus.

14. The apparatus of claim 13, wherein the communication session comprises a bi-directional communication session which is established using a communication protocol and one or more session state application programming interfaces.

15. An article of manufacture comprising a non-transitory processor-readable storage medium having stored therein program code of one or more software programs, wherein the program code when executed by at least one processing device causes said at least one processing device to perform the steps of:
receiving a voice command inputted by a user to a first device, wherein the voice command comprises one or more details to identify a destination device for the voice command;
analyzing the voice command and identifying a second device as the destination device based at least in part on the analysis; and
authenticating the second device;
wherein a connection between the first device and the second device is established over one or more networks;
wherein the connection between the first device and the second device comprises a communication session between a first device agent of the first device and a second device agent of the second device;
wherein the first device agent:
(i) streams the voice command to the second device agent,
(ii) continually streams additional voice commands to the second device agent, and
(iii) identifies one or more voice-activated applications of the second device based at least in part on a registry;
wherein the voice command further comprises one or more instructions for execution of a task on the second device;
wherein in response to streaming the voice command to the second device agent, the second device agent receives the voice command in place of an unavailable voice-receiving apparatus of the second device;
wherein the unavailable voice-receiving apparatus is busy with a voice-receiving application and unavailable to receive the voice command from the user without interrupting the voice-receiving application; and
wherein the second device agent receiving the voice command in place of the unavailable voice-receiving apparatus enables the second device to activate the one or more voice-activated applications in response to the voice command without using the unavailable voice-receiving apparatus.

16. The article of manufacture of claim 15, wherein the communication session comprises a bi-directional communication session which is established using a communication protocol and one or more session state application programming interfaces.

17. The article of manufacture of claim 16, wherein the program code further causes said at least one processing device to format the voice command based at least in part on the one or more session state application programming interfaces.

18. The article of manufacture of claim 15, wherein the voice command is passed to the one or more voice-activated applications on the second device to execute the task.

19. The apparatus of claim 14, wherein the processing device is further configured to format the voice command based at least in part on the one or more session state application programming interfaces.

20. The apparatus of claim 13, wherein the voice command is passed to the one or more voice-activated applications on the second device to execute the task.

* * * * *